(12) United States Patent
Ozdemir

(10) Patent No.: US 7,768,732 B2
(45) Date of Patent: Aug. 3, 2010

(54) GAIN CONTROLLER FOR A GAIN LOOP OF A READ CHANNEL AND RELATED GAIN LOOPS, READ CHANNELS, SYSTEMS, AND METHODS

(75) Inventor: Hakan Ozdemir, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 898 days.

(21) Appl. No.: 11/402,155

(22) Filed: Apr. 10, 2006

(65) Prior Publication Data

US 2006/0256463 A1 Nov. 16, 2006

Related U.S. Application Data

(60) Provisional application No. 60/670,820, filed on Apr. 12, 2005, provisional application No. 60/670,942, filed on Apr. 12, 2005.

(51) Int. Cl.
*G11B 5/035* (2006.01)
(52) U.S. Cl. .............................. 360/65; 360/25; 360/46; 360/67; 360/68
(58) Field of Classification Search ........................ None
See application file for complete search history.

(56) References Cited

U.S. PATENT DOCUMENTS

| | | | | |
|---|---|---|---|---|
| 4,002,977 | A | * | 1/1977 | Sun et al. .................... 324/132 |
| 4,998,234 | A | * | 3/1991 | Rees et al. ............... 369/44.27 |
| 5,448,424 | A | * | 9/1995 | Hirano et al. ................. 360/65 |

(Continued)

FOREIGN PATENT DOCUMENTS

EP 0 805 447 A 11/1997

(Continued)

OTHER PUBLICATIONS

P. Kovintavewat et al., "Coding and signal processing for magnetic recording systems ch. 27", Jul. 2004, CRC Press, XP002384341.

(Continued)

*Primary Examiner*—Dismery E Mercedes
(74) *Attorney, Agent, or Firm*—Lisa K. Jorgenson; Bryan A. Santarelli

(57) ABSTRACT

A gain controller for a gain loop of a read channel includes a comparator circuit, an accumulator circuit, and a function circuit. The comparator circuit determines an error between an actual sample of a read signal and a corresponding ideal sample of the read signal, and the accumulator circuit holds a gain-correction value and adjusts the gain-correction value in response to the error. The function circuit generates a gain-correction signal by performing a predetermined mathematical operation involving the gain-correction value, and provides the gain-correction signal to a variable-gain amplifier that is operable to amplify actual samples of the read signal. Because such a gain controller allows one to locate the variable-gain amplifier (VGA) after the analog-to-digital converter (ADC) in a read channel, the gain controller may significantly reduce the latency of the gain-acquisition (GA) loop or the gain-tracking (GT) loop of the read channel. The gain controller may also allow the GA loop and the GT loop to be completely contained with in the digital portion of the read channel.

31 Claims, 10 Drawing Sheets

U.S. PATENT DOCUMENTS

| | | | |
|---|---|---|---|
| 5,552,942 A | | 9/1996 | Ziperovich et al. |
| 5,583,706 A | * | 12/1996 | Dudley et al. ............... 360/46 |
| 5,812,025 A | * | 9/1998 | Shimazaki ................. 330/129 |
| 5,835,295 A | | 11/1998 | Behrens et al. |
| 5,896,064 A | * | 4/1999 | Kaku ......................... 330/279 |
| 5,991,106 A | * | 11/1999 | Ohmori ....................... 360/46 |
| 6,094,316 A | | 7/2000 | Pham et al. ................. 360/46 |
| 6,172,830 B1 | | 1/2001 | Leonard |
| 6,181,505 B1 | | 1/2001 | Sacks et al. |
| 6,208,481 B1 | * | 3/2001 | Spurbeck et al. ............ 360/65 |
| 6,249,395 B1 | | 6/2001 | Conway |
| 6,252,733 B1 | * | 6/2001 | Staszewski ................. 360/51 |
| 6,282,038 B1 | * | 8/2001 | Bonaccio et al. ............ 360/46 |
| 6,307,696 B1 | * | 10/2001 | Bishop et al. ............... 360/51 |
| 6,366,225 B1 | * | 4/2002 | Ozdemir ..................... 341/111 |
| 6,445,520 B1 | * | 9/2002 | Yang et al. .................. 360/25 |
| 6,487,672 B1 | | 11/2002 | Byrne et al. |
| 6,493,163 B1 | * | 12/2002 | Reed et al. .................. 360/51 |
| 6,566,922 B1 | | 5/2003 | Schell et al. |
| 6,587,529 B1 | * | 7/2003 | Staszewski et al. ........ 375/371 |
| 6,591,223 B1 | | 7/2003 | Geist et al. |
| 6,591,283 B1 | | 7/2003 | Conway et al. |
| 6,661,852 B1 | * | 12/2003 | Genrich ...................... 375/326 |
| 6,748,200 B1 | * | 6/2004 | Webster et al. ........... 455/234.1 |
| 6,775,084 B1 | * | 8/2004 | Ozdemir et al. ............. 360/55 |
| 6,778,345 B1 | * | 8/2004 | Ozdemir ..................... 360/66 |
| 6,791,776 B2 | * | 9/2004 | Kato et al. ................... 360/39 |
| 6,801,380 B1 | * | 10/2004 | Sutardja ...................... 360/65 |
| 6,816,328 B2 | | 11/2004 | Rae |
| 6,819,514 B1 | * | 11/2004 | Behrens et al. .............. 360/65 |
| 6,867,941 B1 | * | 3/2005 | Ozdemir ...................... 360/66 |
| 7,012,772 B1 | * | 3/2006 | Vis ............................ 360/46 |
| 7,023,638 B2 | | 4/2006 | Matsubara et al. |
| 7,409,018 B2 | * | 8/2008 | Kim ........................... 375/345 |
| 7,505,537 B1 | * | 3/2009 | Sutardja ...................... 375/345 |
| 7,579,970 B2 | * | 8/2009 | Seo et al. .................... 341/118 |
| 2001/0043416 A1 | * | 11/2001 | Kato et al. .................... 360/40 |
| 2002/0075981 A1 | | 6/2002 | Tang et al. |
| 2002/0160733 A1 | * | 10/2002 | Kajita ....................... 455/234.1 |
| 2003/0137765 A1 | * | 7/2003 | Yamazaki et al. ............ 360/39 |
| 2005/0018337 A1 | | 1/2005 | Tsuchinaga |

FOREIGN PATENT DOCUMENTS

| | | |
|---|---|---|
| EP | 0 887 796 A | 12/1998 |
| EP | 0 889 473 A | 1/1999 |
| EP | 1 274 079 A | 1/2003 |

OTHER PUBLICATIONS

J.W.M. Bergmans, "Digital Baseband Transmission and Recording", 1996, Kluwer Acedemic Publishers, XP 002385337.

European Search Report for EP 06 25 2035 dated Jun. 8, 2006, mailed Jun. 22, 2006.

European Search Report for EP 06 25 2039 dated Jun. 14, 2006, mailed Jun. 28, 2006.

* cited by examiner

GAIN CONTROLLER FOR A GAIN LOOP OF A READ CHANNEL AND RELATED GAIN LOOPS, READ CHANNELS, SYSTEMS, AND METHODS

CLAIM OF PRIORITY

This application claims priority to U.S. Provisional Application Ser. Nos. 60/670,820 and 60/670,942, filed on Apr. 12, 2005, which are incorporated by reference.

CROSS REFERENCE TO RELATED APPLICATION

This application is related to U.S. patent application Ser. No. 11/402,165 entitled A PHASE ACQUISITION LOOP FOR A READ CHANNEL AND RELATED READ CHANNEL, SYSTEM, AND METHOD, which has a common filing date and assignee and which is incorporated by reference.

BACKGROUND

A data-communications system, such as a computer disk drive or a cell phone, typically includes a read channel, which recovers data from a received read signal (sometimes called a data signal) by synchronizing a read-signal sample clock to the read signal and by controlling the read-channel gain to impart a predetermined amplitude to the read signal.

The read signal often includes a preamble, which precedes the data and which facilitates the synchronizing of the sample clock and the controlling of the channel gain.

An analog-synchronizing data-communications system shifts the phase and frequency of the sample clock to respectively match the phase and frequency of the data that the read signal is carrying. But shifting the phase and/or frequency of the sample clock may generate harmonics of the sample-clock frequency, and these harmonics may introduce into the read channel noise that increases the data-recovery error rate of the read channel.

In contrast, a digital-synchronizing data-communications system effectively, but not actually, shifts the phase and frequency of a free-running sample clock to respectively match the phase and frequency of data that the read signal is carrying that is free running at the expected frequency of the data.

In this type of system, the read channel may include a phase-acquisition (PA) loop for acquiring the phase difference between the data and the sample clock, and may include an interpolated-timing-recovery (ITR) circuit, which, in response to the acquired phase difference, effectively shifts the phase and frequency of the free-running sample clock to respectively match the phase and frequency of the data. Specifically, the ITR circuit alters the phase of an actual sample of the data signal such that the altered sample has substantially the same magnitude/phase that the actual sample would have had if the sample clock had been synchronized to the data. Furthermore, if the frequency of the sample clock is less than twice the frequency of the data—this is an under-sampling condition where the read channel periodically generates fewer than two samples during a period of the data—then the ITR circuit may compensate by periodically processing a sample twice. Conversely, if the frequency of the sample clock is greater than twice the frequency of the data—this is an over-sampling condition where the read channel periodically generates more than two samples during a period of the data—then the ITR circuit may compensate by periodically processing an extra sample simultaneously with the normally processed sample(s).

As discussed in more detail below, a potential problem with a digital-synchronizing data-communications system is that the PA loop of the read channel may limit the amount of data that the read channel can process during a given time period or that one can store in a storage medium of a given size. The PA loop is often relatively slow, and thus may take a relatively long time to acquire the phase difference between the data and the sample clock, particularly where the data has a different frequency than the sample clock. Because the PA typically acquires the phase difference during the preamble of the read signal, the preamble may be relatively long to accommodate the slow speed of the PA loop. Unfortunately, the longer the preamble, the less data that the read channel can process during a given period for a data-communications system such as a cell phone, and the less data that one can store in a fixed-size storage medium, such as a magnetic disk, that the read channel reads.

Furthermore, in a digital-synchronizing data-communications system, the read channel may include a gain-acquisition (GA) loop for acquiring the gain of the read channel that sets the amplitude of the read signal to a desired level.

As discussed in more detail below, another potential problem with a digital-synchronizing data-communications system is that it like the PA loop, the GA loop of the read channel may limit the amount of data that the read channel can process during a given time period or that one can store in a storage medium of a given size. Like the PA loop, the GA loop is often relatively slow, and thus may take a relatively long time to acquire the proper gain for the read channel. Because the GA loop typically acquires the gain during the preamble of the read signal, the preamble may be relatively long to accommodate the slow speed of the GA loop. Unfortunately, as discussed above, the longer the preamble, the less data that the read channel can process during a given period and the less data that one can store on a fixed-size storage medium that the read channel reads.

Also as discussed in more detail below, another potential problem with a digital-synchronizing data-communications system is that there is little flexibility in locating the variable-gain stage used to adjust the gain of the read channel. Typically, the variable-gain stage is an analog variable-gain amplifier, which thus must be placed in front of the channel's analog-to-digital converter (ADC). Consequently, one cannot locate the variable-gain stage in back of the ADC even if such a location may be desired in a particular application.

The following is a brief overview of the operation of the PA loop and the ITR circuit during the preamble of the read signal.

FIG. 1 is a timing diagram of a sinusoidal preamble 10 of a read signal, a sample clock 12 that is synchronized to the preamble, and a sample clock 14 that has the same frequency as but is out of phase with the preamble. The preamble has a peak-to-peak amplitude of 2 (−1 to +1).

Referring to the synchronized sample clock 12, the rising edges 16 are aligned with the peaks 18 of the preamble 10, and the falling edges 20 are aligned with the zero crossings 22 of the preamble. That is, the rising edges 16 sequentially generate alternating sample values "+1" and "−1", and the falling edges 20 generate sample values "0". The preamble peaks 18 and zero crossings 22 correspond to the preferred times for the sample clock 12 to sample the subsequent data portion (not shown) of the read signal. Therefore, because the sample clock 12 is synchronized with the preamble 10, it will also be synchronized to the data portion of the read signal.

In contrast, referring to the unsynchronized sample clock 14, which lags the synchronized sample clock 12 by 180° in this example, the rising edges 24 of the unsynchronized sample clock are aligned with the zero crossings 22 of the preamble 10, and the falling edges 26 are aligned with the peaks 18 of the preamble. That is, the rising edges of 24 generate sample values "0", and the falling edges 26 sequentially generate alternating sample values "+1" and "−1".

Consequently, if the system sample clock has the same phase as the unsynchronized sample clock 14, then the PA loop of the read channel acquires the phase difference of −90° (a phase lag) between the sample clock and the preamble 10 during a phase-acquisition period T sync—the phase difference is −90°, not 180°, because the frequency of the preamble sinusoid is half that of the sample clock. Furthermore, although not shown in FIG. 1, if the sample clock has a different frequency than the preamble 10, then the phase difference will not be constant, but will change from sample to sample. But because phase is merely the integral of frequency, one can track the frequency difference over time by tracking the phase difference over time.

In response to this acquired phase difference of −90°, the ITR circuit effectively shifts the phase of the sample clock 14 by +90° relative to the preamble 10 by sequentially generating adjusted sample values of "−1" and "+1" for alternating actual sample values of "0" generated at the rising edges 24, and by generating an adjusted sample value of "0" for each actual sample value of "−1" and "+1" generated at the falling edges 26.

The following is a more detailed discussion of a PA loop, and a discussion of a GA loop.

FIGS. 2A and 2B are a block diagram of a conventional read channel 30 for a disk drive. FIG. 2A shows a data path 32 and a PA loop 34 of the read channel 30, and FIG. 2B shows the data path and a GA loop 36 of the read channel. Although not shown, a sample clock, such as the sample clock 12 or the sample clock 14 of FIG. 1, drives each of the illustrated components of the read channel 30.

Referring to FIGS. 2A-2B, the data path 32 includes a front end 38, an ITR circuit 40, a finite-impulse-response (FIR) filter 42, and a Viterbi detector 44. The data path 32 may generate and process one or more samples of the read signal at a time. For example, a half-rate data path 32 generates and processes two samples of the read signal during each period of the sample clock.

The front end 38 includes a read head and pre-amplifier 46, a variable-gain amplifier (VGA) 48, and an analog-to-digital converter (ADC) 50. The read head and pre-amplifier 46 convert the data and other information stored on the disk (not shown in FIGS. 2A and 2B) into an analog read signal, and the VGA 48 adjusts the amplitude of the analog read signal to a predetermined value or range of values deemed suitable for the subsequent components of the data path 32. The ADC 50 samples the gain-adjusted analog read signal in response to the sample clock (not shown in FIGS. 2A and 2B), and thus converts the analog read signal into a digital read signal.

As discussed above, the ITR circuit 40 adjusts the values of the samples from the ADC 48 to correct for a nonzero phase difference between the sample clock and the data, and also manipulates the samples as needed to compensate for under sampling or over sampling. An example of an ITR circuit that may be the same as or similar to the ITR circuit 40 is disclosed in U.S. Pat. No. 6,556,633 and U.S. Publication No. 2002/0067781, which are incorporated by reference.

The FIR 42 equalizes the phase-corrected and sampling-rate-compensated samples from the ITR circuit 40 to a time-domain waveform that corresponds to target polynomial (e.g., PR4, EPR4, $E^2PR4$) that represents or approximates the frequency response of the data stored on the disk (not shown in FIGS. 2A and 2B).

The Viterbi detector 44 recovers the stored data from the equalized samples of the read signal received from the FIR 42. An example of a Viterbi detector that may be the same as or similar to the Viterbi 44 is disclosed in U.S. Pat. No. 6,662,338 and U.S. Publication Nos. 2004/0010749 and 2004/0010748, which are incorporated by reference.

Referring to FIG. 2A, in addition to the ITR 40 and the FIR 42, the PA loop 34 includes a pattern generator (PGEN) 52, a multiplexer (MUX) 54, an ideal sample generator (ISG) 56, a delay circuit 58, a phase detector 60, a proportional-integral filter (PIF) 62, a phase-correction value (T) accumulator 64, and a zero-phase-restart (ZPR) circuit 66. The phase-correction value T effectively equals the complement of the phase difference between the sample clock and the data, and is the amount by which the ITR 40 effectively shifts the phase of the sample clock to synchronize the sample clock to the data. Therefore, the PA loop 34 effectively acquires the phase difference (sometimes abbreviated to only "phase") between the sample clock and the data by acquiring the phase-correction value T. Similarly, a phase tracking (PT) loop, which is described below, effectively tracks the phase between the sample clock and the data by tracking T.

The PGEN 52 receives from the ZPR 66 an initial value of the phase-correction value T between the preamble sinusoid and the sample clock (FIG. 1), and, in response to the initial value of T, generates a value that represents the point (0, +1, −1) of the preamble that the sample clock would have caused the ADC 50 to sample if the initial phase difference, and thus the initial value of T were both equal to zero.

The MUX 54 couples the input of the ISG 56 to the output of the PGEN 52 during acquisition of the phase-correction value T (which, as discussed above, is the complement of the phase difference between the read signal and the sample clock), and couples the input of the ISG 56 to the output of the Viterbi detector 44 during tracking of T—the phase-correction value T is maintained, i.e., tracked, after the PA loop 34 acquires T as discussed below.

The ISG 56 generates an ideal sample value that is based on the value from the PGEN 52 during phase acquisition, and that is based on the recovered data from the Viterbi detector 44 during phase tracking. The ideal sample value is the value that a sample would have assuming that, e.g., the phase difference, and thus the phase-correction value T, equals 0, no noise is present on the read signal while the sample is generated, and the gain of the VGA 48 is such that the amplitude of the read signal has a predetermined value.

The delay circuit 58 provides that both inputs to the phase detector 60 correspond to the same sample of the read signal. Specifically, during acquisition of the phase-correction value T, the delay circuit 58 delays a sample output from the FIR 42 by a time substantially equal to the time required for the PGEN 52 to generate a value, for the value to propagate through the MUX 54, and for the ISG 56 to generate a corresponding ideal sample value. And during tracking of the phase-correction value T, the delay circuit 58 delays a sample output from the FIR 42 by a time substantially equal to the time required for the Viterbi detector 44 to generate a data value, for the value to propagate through the MUX 54, and for the ISG 56 to generate a corresponding ideal sample value. Therefore, the delay circuit 58 may have different delay times during phase acquisition and phase tracking.

The phase detector 60 compares the value of the delayed FIR sample from the delay circuit 58 with the ideal sample value from the ISG 56, and from the difference between these two values determines a raw phase difference between the read signal and the sample clock.

The PIF 62 filters high-frequency noise and other high-frequency artifacts such as jitter from the raw phase difference received from the phase detector 60 to generate an error signal. More specifically, the PIF 62 includes two paths or portions that are not shown in FIG. 2A: an integrator portion, sometimes called the frequency accumulator, that integrates the error signal to generate a frequency-correction component of the phase-correction value T, and a proportional portion that generates from the error signal an instantaneous-phase-correction component of T.

The accumulator 64 stores the phase-correction value T, and increments or decrements T in proportion to the magnitude and polarity of the error signal from the PIF 62.

The ZPR circuit 66 exploits the sinusoidal form of the read-signal preamble (FIG. 1) to generate and provide to the accumulator 64 and to the PGEN 52 an initial value of the phase-correction value T during the acquisition of T by the PEA loop 34. By providing an initial value of T, the ZPR circuit 66 may significantly reduce the time that the PA loop 34 requires to acquire T. Examples of ZPR circuits that may be the same as or similar to the ZPR circuit 66 are disclosed in U.S. Pat. Nos. 6,775,084 and 6,366,225, which are incorporated by reference.

Still referring to FIG. 2A, the operation of the PA loop 34 is discussed. Generally, the PA loop 34 acquires the phase of the sample clock relative to the data. That is, the PA loop 34 determines the error, i.e., difference, between the phases of the sample clock and data, and generates a phase-correction value T, which the ITR 40 uses to effectively reduce this phase difference.

In response to a read-data-sector command from the computer or other system (not shown in FIGS. 2A and 2B) in which the read channel 30 is incorporated, the front end 38 begins reading and generating samples of the sinusoidal preamble (FIG. 1), which is located at the beginning of the data sector (not shown in FIGS. 2A and 2B) being read. As discussed below in conjunction with FIG. 2B, the GA loop 36 begins to set the gain of the VGA 48 to a suitable value. For purposes of explanation of the PA loop 34, it is assumed that at all times the VGA 48 has a gain suitable for proper operation of the PA loop. This assumption is typically valid as discussed below in conjunction with FIGS. 2B-3.

The ZPR circuit 66 determines an initial phase difference between the sample clock and the sinusoidal preamble from the ADC 50, and from the initial phase difference calculates an initial value of the phase-correction value T using the first n samples of the preamble. For example, n may range from 8-24 samples.

Next, the ZPR circuit 66 loads the initial value of the phase-correction value T into the T accumulator 64 and into the PGEN 52.

Then, in response to the initial value of T, the PGEN 52 generates a PGEN value representing the in-phase sample value (−1, 0, or +1) of the preamble for the current period of the sample clock, and the MUX 54 provides this value to the ISG 56.

Next, the ISG 56 generates the ideal value (−1, 0, or +1) of the in-phase sample represented by the PGEN value, and provides this ideal sample value to the phase detector 60.

Concurrently with the above-described operations of the PGEN 52, MUX 54, and ISG 56, the delay circuit 58 provides to the phase detector 60 the actual sample value from the FIR 42, where the actual sample value is the actual value of the same sample to which the ideal sample value from the ISG 56 corresponds.

Then, the phase detector 60 determines the difference between the actual and ideal sample values from the delay circuit 58 and the ISG 56, respectively, and from this difference calculates a raw phase difference between the sample clock and the data that the read signal is carrying.

Next, the PIF 62 generates an error signal in response to the raw phase difference from the phase detector 60. The frequency response of the PIF 62 is designed to stabilize the PA loop 34 so that the PA loop has a desired transient response and does not oscillate.

Then, in response to the error signal from the PIF 62, the accumulator 64 adjusts the value T in the accumulator.

The PA loop 34 operates in this iterative fashion for subsequent samples of the preamble until the phase-correction value T in the accumulator 64 converges substantially to the value that corresponds to the actual phase difference between the sample clock and the data that the read signal is carrying.

After the PA loop 34 acquires the phase-correction value T during the preamble portion of the read signal, a phase tracking (PT) loop maintains T substantially equal to the value that corresponds to the actual phase difference between the sample clock and the data during the data portion of the read signal—although not outlined in FIG. 2A, the PT loop is the same as the PA loop 34 except that the PT loop includes the Viterbi detector 44 and lacks the PGEN 52 and the ZPR circuit 66 during tracking of T. The PT loop operates similarly to the PA loop 34, except that the ZPR circuit 66 is inactive and the MUX 54 provides the output of the Viterbi detector 44, not the output of the PGEN 52, to the ISG 56. During the data portion of the read signal, the read signal may no longer be sinusoidal. Consequently, the ISG 56 calculates the ideal sample values using data from the Viterbi detector 44 and the target polynomial according to which the FIR 42 equalizes the samples of the read signal.

Still referring to FIG. 2A, it has been estimated that where the read channel 30 generates and processes two samples of the read signal per period of the sample clock, the PA loop 34 requires approximately 118-154 samples of the sinusoidal preamble to acquire the phase-correction value T for a worst-case frequency error of 0.4% between the sample clock and the data. Specifically, where the latency of the PA loop 34 (the number of periods of the sample clock required for a signal to propagate from any point of the loop back to that point) is 15 periods of the sample clock, then, to acquire T under a worst-case condition, it is estimated that the PA loop requires Tsync (FIG. 1) to include approximately 118-134 samples of the preamble sinusoid (110 samples of the preamble subsequent and in addition to the 8-24 samples that the ZPR circuit 66 requires to generate an initial value for T). And where the latency of the PA loop 34 is 17 periods of the sample clock, then, to acquire T under a worst-case condition, it is estimated that the PA loop requires Tsync to include approximately 138-154 samples of the preamble (130 samples of the preamble subsequent and in addition to the 8-24 samples that the ZPR circuit 66 requires to generate an initial value for T).

Unfortunately, as stated above, the longer the preambles of the data sectors, the less data that one can store on a disk of a given storage capacity. For example, if a disk includes one million data sectors, then every eight samples that the preamble provides reduces the data-storage capacity of the disk by 1 Megabyte (MB).

Referring to FIG. 2B, in addition to the ITR 40, the FIR 42, the PGEN 52, the MUX 54, the ISG 56, and the delay circuit 58, the GA loop 36 includes the VGA 48, the ADC 50, a zero-gain-restart (ZGR) circuit 68, and a gain controller 70.

The ZGR circuit 68 exploits the sinusoidal form of the preamble (FIG. 1) to generate and provide to the gain controller 70 an initial gain-correction (GC) value corresponding to the difference between the predetermined desired amplitude and the amplitude of the digital read signal from the ADC 50. By providing an initial value of the GC value, the ZGR circuit 68 may significantly reduce the time that the GA loop 36 requires to acquire the VGA gain that causes the read signal to have the desired amplitude. Examples of ZGR circuits that may be the same as or similar to the ZGR circuit 68 are disclosed in U.S. patent application Ser. Nos. 09/503,949 and 09/503,399, which are incorporated by reference.

FIG. 3 is a schematic diagram of the gain controller 70 and the VGA 48 of FIG. 2A. The gain controller 70 generates a gain-control (GC) signal—the GC signal may be analog or digital—value based on the difference between the ideal and actual sample values from the ISG 56 and the delay circuit 58, and provides the GC signal to the VGA 48; the GC signal causes the VGA to impart the desired amplitude to the read signal.

The gain controller 70 includes a comparator 72, which calculates the difference between the ideal and actual sample values, and an amplifier 74, which has a fixed gain K over a predetermined bandwidth and which amplifies the difference to generate an error signal. The combination of the comparator 72 and the amplifier 74 may be referred to as a comparator circuit. The gain controller 70 also includes an accumulator 76, which stores the GC value from which the accumulator (or other circuitry such as a digital-to-analog converter (DAC) (not shown)) generates the GC signal. For example, where the GC signal is a digital signal, the GC signal may equal the GC value. Initially, the accumulator 76 stores the initial GC value from the ZGR 68 (FIG. 2). The gain controller 70 further includes an adder 78, which updates the GC value in the accumulator 76 in response to the error signal from the amplifier 74. The combination of the accumulator 76 and the adder 78 may be referred to as an accumulator circuit.

Referring to FIGS. 2B-3, the operation of the GA loop 36 is discussed.

In response to a read-data-sector command from the computer or other system (not shown in FIGS. 2A-3) in which the read channel 30 is incorporated, the front end 38 begins reading and generating samples of the sinusoidal preamble (FIG. 1), which is located at the beginning of the data sector (not shown in FIGS. 2A-3) being read. As discussed above in conjunction with FIG. 2A, the GA loop 36 begins to set the gain of the VGA 48 to a suitable value. For purpose of explanation of the GA loop 36, it is assumed that at all times the phase-correction value accumulator 64 (FIG. 2A) provides a value of T suitable for proper operation of the GA loop. This assumption is typically valid, because the ZPR 66 and the ZGR 68 operate independently of one another, and the initial values provided by the ZPR and ZGR typically allow the interdependent PA and GA loops 34 and 36 to operate properly.

The ZGR circuit 68 determines an initial value of the difference between the desired amplitude and the actual amplitude of the sinusoidal preamble read signal using the first n samples of the sinusoidal preamble from the ADC 50, and from this value generates an initial GC value. For example, n may range from 8-24 samples.

Next, the ZGR circuit 68 loads the initial GC value into the accumulator 76, which provides to the VGA 48 an initial GC signal based on this initial GC value.

Then, the PGEN 52, MUX 54, ISG 56, and delay circuit 58 operate as discussed above in conjunction with the operation of the PA loop 34 of FIG. 2A. The ideal sample value from the ISG 56 has a value that represents the ideal amplitude of the actual sample at the output of the FIR 42.

Next, the comparator 72 determines the difference between the actual and ideal sample values from the delay circuit 58 and the ISG 56, respectively, and provides this difference to the amplifier 74.

Then, the amplifier 74 amplifies the difference from the comparator 72 to generate the read-signal-amplitude error signal, and provides this gain error signal to the adder 78.

Next, in response to the error signal from the amplifier 74, the adder 78 adjusts the GC value in the accumulator 76 in proportion to the magnitude and polarity of the error signal.

The GA loop 36 operates in this iterative fashion for subsequent samples of the preamble until the GC value in the accumulator 76 converges to a value that causes the read signal in the data path 32 to have substantially the desired amplitude.

After the GA loop 36 acquires the GC value during the preamble portion of the read signal, a gain-tracking (GT) loop maintains the GC value at an appropriate value—although not outlined in FIG. 2B, the GT loop is the same as the GA loop 34 except that the GT loop includes the Viterbi detector 44 and lacks the PGEN 52 and the ZGR circuit 68. During tracking of the GC value, the GT loop operates similarly to the GA loop to maintain the amplitude of the read signal at a desired level, except that the ZGR circuit 68 is inactive and the MUX 54 provides the output of the Viterbi detector 44, not the output of the PGEN 52, to the ISG 56. Consequently, as discussed above in conjunction with the PA loop 34 of FIG. 2A, the ISG 56 calculates the ideal sample values using the recovered data from the Viterbi detector 44 and the target polynomial according to which the FIR 42 equalizes the samples of the read signal.

Referring to FIG. 2B, because the analog VGA 48 must be located in front of the ADC 50, the GA loop 36 has a relatively large latency, and thus requires a relatively large number of samples of the preamble to accurately acquire the GC value that results in the desired amplitude for the read signal. The location of the VGA 48 in front of the ADC 50 may also cause other problems, such as saturation of the ITR 40, FIR 42, or Viterbi detector 44—saturation occurs when the amplitude of a signal input to or output from a circuit exceeds the circuit's input or output amplitude range.

Unfortunately, as discussed above in conjunction with the PA loop 34 of FIG. 2A, the longer the preambles of the data sectors, the less data that one can store on a disk of a given storage capacity.

Moreover, because the VGA 48 is in front of the ADC 50, the GA loop 36 and the GT loop both encompass the digital portion of the read channel 30 (the portion in back of the ADC) and the analog front end 38 of the read channel.

Unfortunately, it may be desirable for the GA loop 36 and the GT loop to be located entirely within the digital portion of the read channel 30.

SUMMARY

An embodiment of a gain controller for a gain loop of a read channel includes a comparator circuit, an accumulator circuit, and a function circuit. The comparator circuit determines a difference between an actual sample of a read signal and a corresponding ideal sample of the read signal, and the accumulator circuit holds a gain-correction value and adjusts the gain-correction value in response to the difference. The function circuit generates a gain-correction signal by performing a predetermined mathematical operation involving the gain-correction value, and provides the gain-correction signal to a variable-gain amplifier that is operable to amplify actual samples of the read signal.

Because such a gain controller allows one to locate the VGA after the ADC in a read channel, the gain controller may significantly reduce the latency of the GA loop or the GT loop of the read channel. Such a reduction in the latency of the GA loop may allow one to significantly reduce the lengths of the data-sector preambles. And such a reduction in the latency of the GT loop may increase the gain-tracking speed of the GT loop, and thus render the GT loop more suitable than prior GT loops for use in a disk drive subject to significant vibration, such as a disk drive in a portable music device. Furthermore, such a gain controller allows a gain-acquisition loop to be contained completely within the digital portion of the read channel.

DETAILED DESCRIPTION

The following discussion is presented to enable a person skilled in the art to make and use one or more embodiments of the invention. The general principles described herein may be applied to embodiments and applications other than those detailed below without departing from the spirit and scope of the invention. Therefore the present invention is not intended to be limited to the embodiments shown, but is to be accorded the widest scope consistent with the principles and features disclosed or suggested herein.

Figure 4:
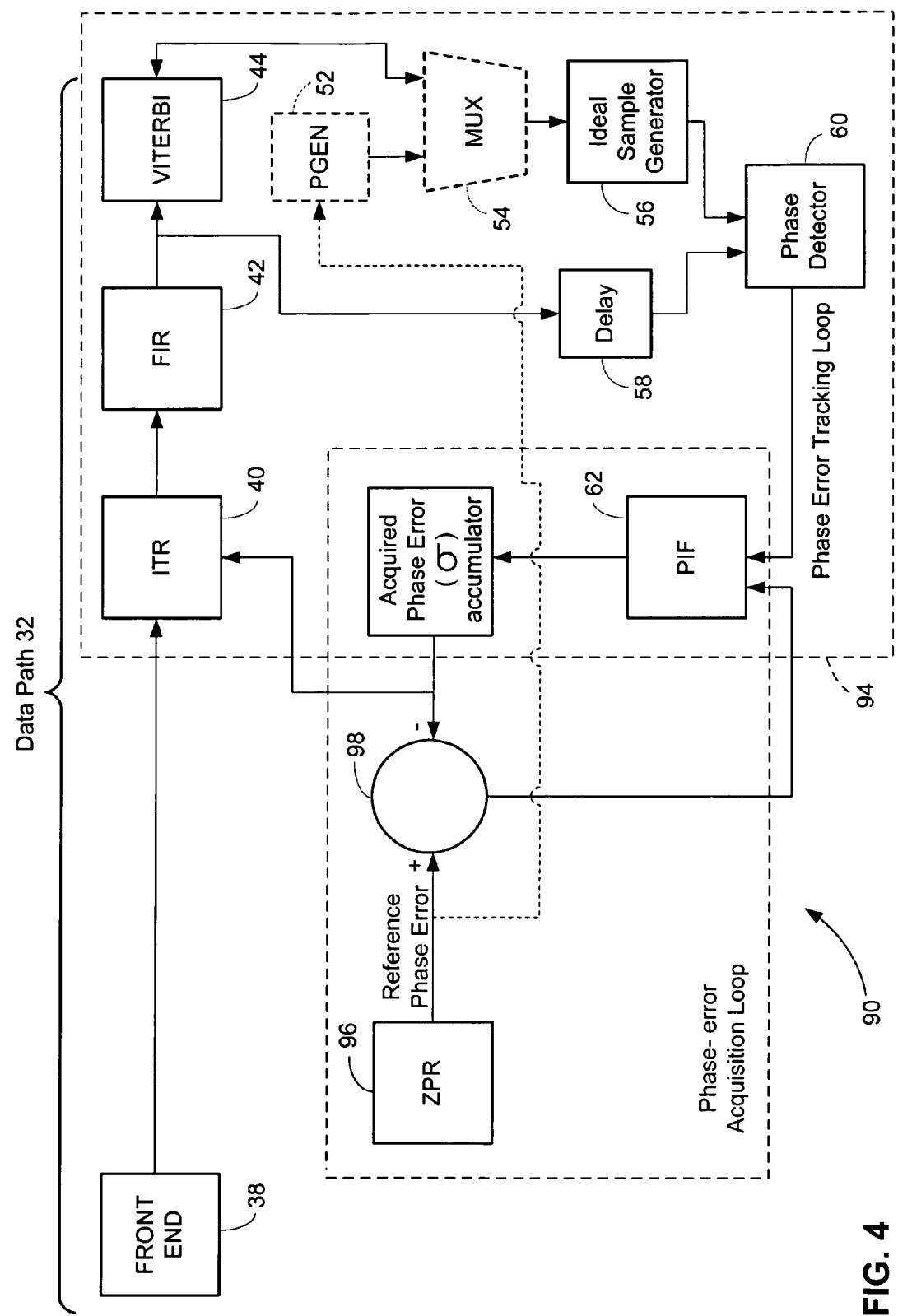
FIG. 4 is a schematic block diagram of a read channel for a disk drive, and of a PA loop of the read channel according to an embodiment of the invention.

FIG. 4 is a schematic block diagram of a read channel 90 for a disk drive (not shown in FIG. 4), and of a phase-acquisition (PA) loop 92 of the read channel according to an embodiment of the invention. As discussed below, because the PA loop 92 has a significantly lower latency than the PA loop 34 of FIG. 2A, the loop 92 requires significantly fewer samples of the preamble (FIG. 1) than the loop 34 requires to acquire the phase-correction value T, and thus the loop 92 may allow a significant reduction in the length of the preamble as compared to the length of the preamble required by the loop 34. For purposes of contrast, FIG. 4 also shows a phase-tracking (PT) loop 94 of the read channel 90, where the PT loop 94 is similar to the PT loop of the read channel 30 of FIG. 2A. Furthermore, for clarity, like numbers are used to reference components of the read channel 90 that are common to the read channel 30 of FIG. 2A.

The PA loop 92 includes the PIF 62, the phase-correction value T accumulator 64, a zero-phase-restart (ZPR) circuit 96, and a comparator 98.

Figure 1:
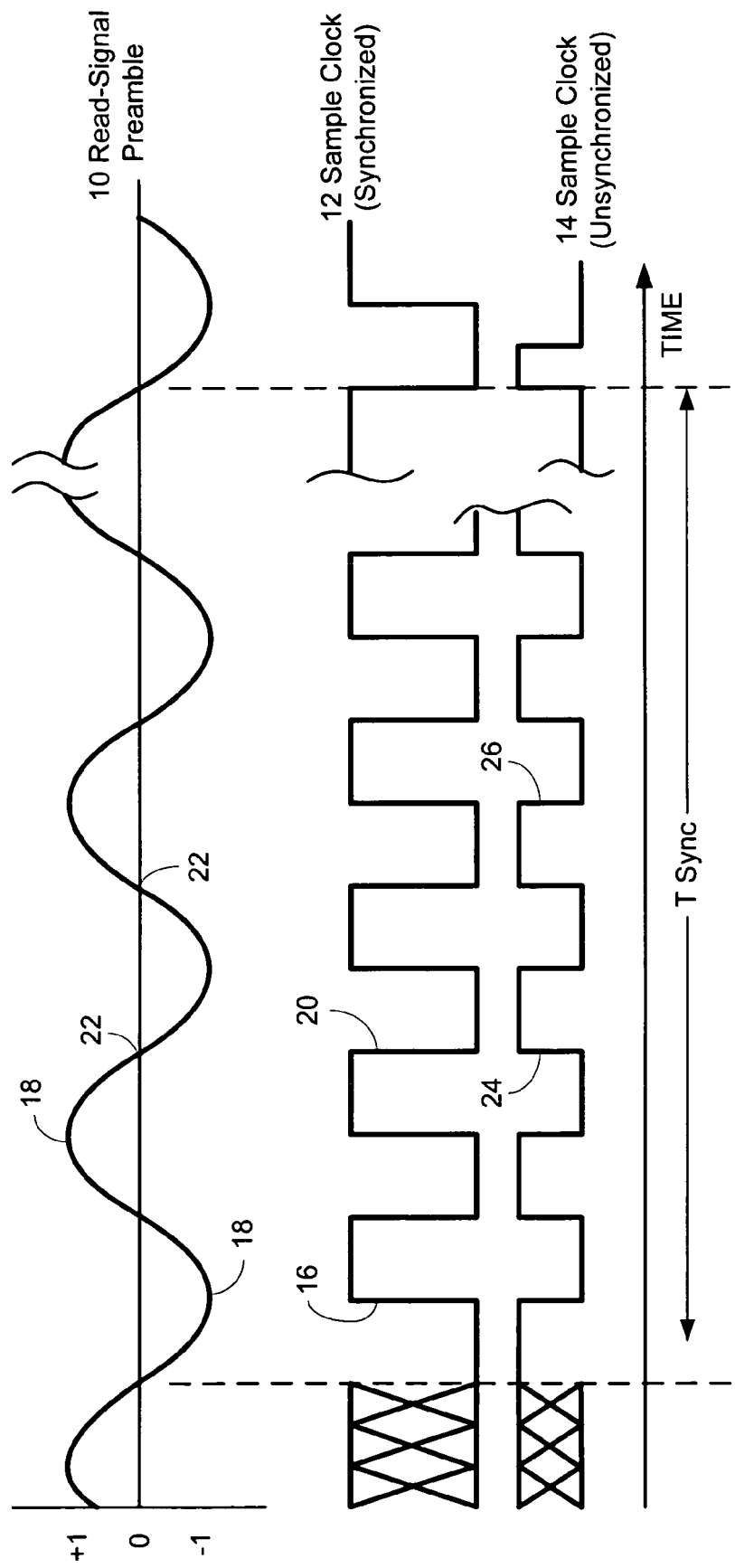
FIG. 1 is a timing diagram of a sinusoidal preamble of a read signal, a first sample clock that is synchronized to the preamble in frequency and in phase, and a second sample clock that is synchronized to the preamble in frequency but unsynchronized to the preamble in phase the same frequency as but is out of phase with the preamble.
Figure 2A:
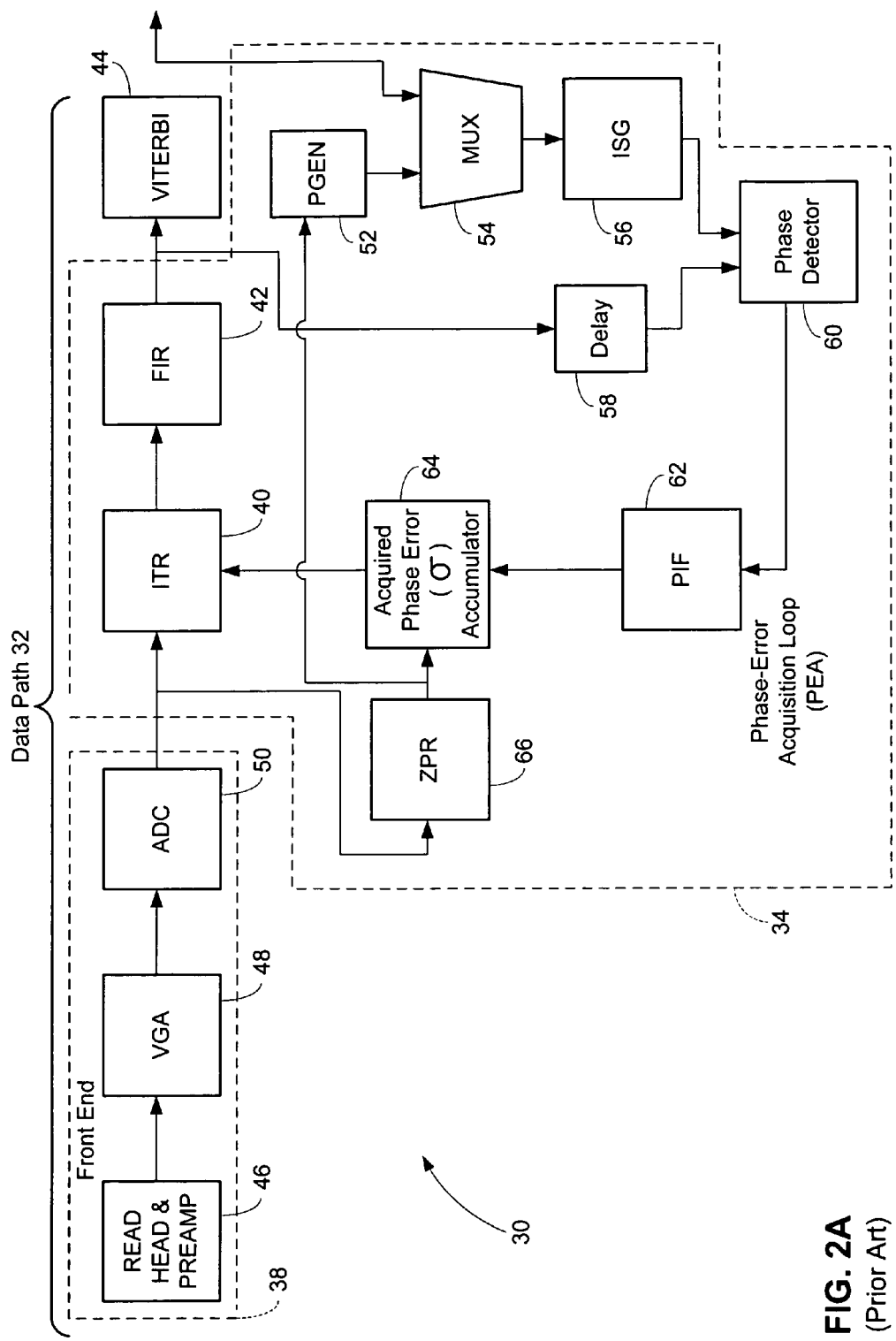
FIG. 2A is a block diagram of a read channel for a disk drive, and of a phase-acquisition (PA) loop of the read channel.

The ZPR circuit 96 determines a reference phase-correction value that is the complement of the phase difference between the sample clock and the sinusoidal preamble (FIG. 1) in a manner similar to the manner that the ZPR circuit 66 of FIG. 2A employs, but is different from the ZPR circuit 66 in at least two ways. First, instead of generating only a single, initial value of the phase-correction value, the ZPR circuit 96 updates this phase-correction value for every subsequent sample of the preamble (or during every subsequent period of the sample clock if the ZPR circuit 96 and the other components of the read channel 90 process two or more samples per period of the sample clock) for the duration of the preamble time Tsync (FIG. 1). Second, the ZPR 96 provides these initial and updated phase-correction values to the comparator 98 instead of to the accumulator 64. But like the ZPR circuit 66, the ZPR circuit 96 may also provide the initial value of the phase-correction value to the PGEN 52, because even though the PGEN is not part of the PA loop 92, the PGEN may be part of the gain-acquisition (GA) loop (not shown in FIG. 4) of the read channel 90.

Still referring to FIG. 4, the operation of the PA loop 92 is discussed according to an embodiment of the invention.

In response to a read-data-sector command from the computer or other system (not shown in FIGS. 2A-3) in which the read channel 90 is incorporated, the front end 38 begins reading and generating samples of the sinusoidal preamble (FIG. 1) at the beginning of the data sector (not shown in FIG. 4) being read.

Next, the ZPR circuit 96 calculates an initial value of a reference phase-correction value(distinguished from the acquired phase-correction value T per below) using the first n samples of the sinusoidal preamble from the ADC 50. For example, n may range from 8-24 samples. Because the ZPR circuit 96 can calculate the reference phase-correction value independently of the amplitude of the read signal, whether the front end 38 imparts a desired amplitude to the read signal is irrelevant.

Then, the ZPR circuit 96 provides the initial value of the reference phase-correction value to a non-inverting input of the comparator 98 (and to the PGEN 52 if the PGEN is present).

While the non-inverting input of the comparator 98 is receiving the initial value of the reference phase-correction value from the ZPR circuit 96, the inverting input of the comparator receives the initial value of the acquired phase-correction value T from the accumulator 64. As discussed above in conjunction with FIG. 2A, the integrating portion (not shown in FIG. 4) of the PIF 62 integrates the difference between the reference and acquired phased-correction values, and this integrated difference is an indicator of the frequency difference between the sample clock and the preamble of the read signal. For this reason, the integrating portion of the PIF 62 is usually called the frequency accumulator. The initial value stored in the frequency accumulator, from which the initial value of T is calculated, may be "left over" from the reading of the previous data sector, or may be initialized to a predetermined value such as zero each time that the PA loop 92 is activated.

Next, the comparator 98 subtracts the initial value of the acquired phase-correction value T stored in the accumulator 64 from the initial value of the reference phase-correction value, and provides this difference to the PIF 62.

Then, the PIF 62 filters the difference from the comparator 98 to generate an error signal that causes the accumulator 64 to adjust the acquired phase-correction value T toward the reference phase-correction value from the ZPR circuit 96.

Next, for each subsequent cycle of the sample clock, the ZPR circuit 96 updates the value of the reference phase-correction value, and provides the updated reference phase-correction value error to the non-inverting input of the comparator 98.

While the non-inverting input of the comparator 98 is receiving the updated value of the reference phase-correction value from the ZPR circuit 96, the inverting input of the comparator receives the adjusted value of the acquired phase-corrected value T from the accumulator 64.

Next, the comparator 98 subtracts the adjusted value of the acquired phase-correction value T stored in the accumulator 64 from the updated value of the reference phase-correction value, and provides this difference to the PIF 62.

Then, the PIF 62 filters the difference from the comparator 98 to generate the error signal, which causes the accumulator 64 to further adjust the acquired phase-correction value T toward the reference phase-correction value.

The PA loop 92 operates in this iterative fashion during subsequent periods of the sample clock until the acquired phase-correction value T in the accumulator 64 converges substantially to the value corresponding to the actual phase difference between the sample clock and the data that the read signal is carrying. In this embodiment, because the PIF 62 filters out higher frequencies from the error signal, then the PA loop 92 operates until the acquired phase-correction value T substantially equals the lower-frequency average of the reference phase-correction value from the ZGR circuit 96.

Still referring to FIG. 4, it has been estimated that where the read channel 90 generates and processes two samples of the read signal per period of the sample clock, the PA loop 92 requires approximately 60 samples of the preamble (FIG. 1) for the acquired phase-correction value T to converge to a value that causes the corrected phase between the sample clock and the data carried by the read signal to be within 0.05% of the actual phase for a worst-case error of 0.4% between the frequency of the sample clock and the frequency of the data. Because 60 samples is approximately between ½-⅓ the number of samples that the conventional PA loop 34 (FIG. 2A) requires, then PA loop 92 allows one to reduce the length of the preamble by a factor of approximately between 2 and 3. More specifically, in one example, the latency of the PA loop 92 is 2-3 periods of the sample clock; therefore, to acquire the phase-correction value T under an anticipated worst-case condition, it is estimated that the PA loop requires approximately 36-52 samples of the preamble subsequent to the 8-24 samples that the ZPR circuit 96 requires to generate an initial value for the reference phase-correction value.

Consequently, because the PA loop 92 allows one to shorten the preamble of each data sector, the loop allows one to store more data on a disk of a given storage capacity than the conventional PA loop 34 of FIG. 2A allows. For example, if a disk includes one million data sectors, then shortening each preamble by 60 samples may increase the data-storage capacity of the disk by approximately 7.5 MB.

Still referring to FIG. 4, alternate embodiments of the PA loop 92 are contemplated. For example, the input of the ZPR circuit 96 can be coupled to any point of the data path 32 between the output of the ADC (not shown in FIG. 4 but the last stage of the front end 38) and the input of the ITR circuit 40. Furthermore, the PIF 62 may be replaced with another type of filter, and the PIF and comparator 98 may be combined into a single circuit such as a differential-amplifier circuit. Moreover, portions of the read channel 90, such as the ITR circuit 40, FIR 42, and Viterbi detector 44, not used during acquisition of T may be disabled during part or all of the phase-acquisition period. In addition, although described for use in a disk drive, one may modify the read channel 90 for use in other data-reading devices. For example, one may modify the front end 38 to include an antenna and demodulation circuitry, and make other modifications so that the read channel 90 is suitable for use in a cell phone.

Figure 5:
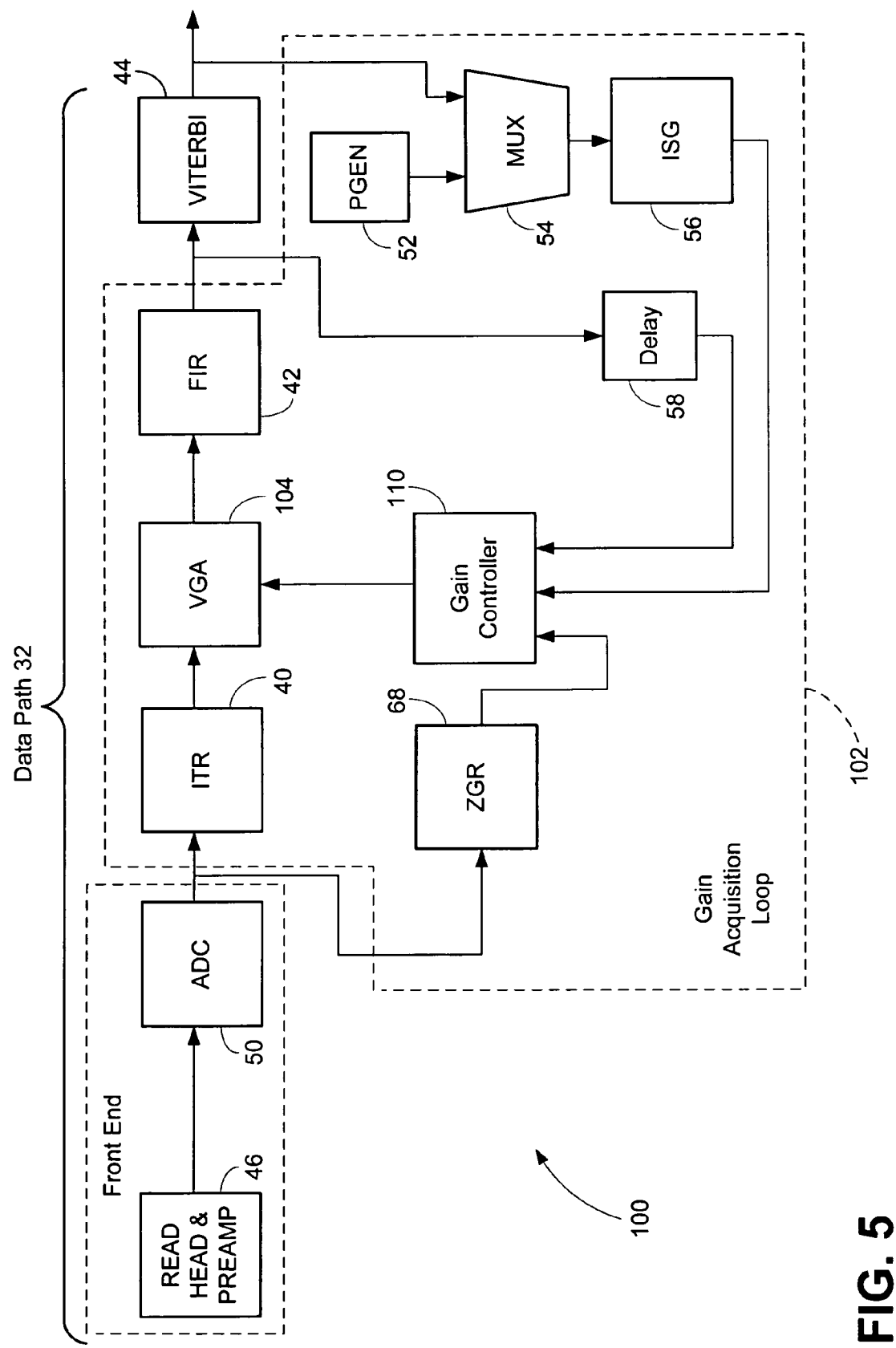
FIG. 5 is a schematic block diagram of a read channel for a disk drive, and of a GA loop of the read channel according to an embodiment of the invention.

FIG. 5 is a schematic block diagram of a read channel 100 for a disk drive (not shown in FIG. 5), and of a GA loop 102 of the read channel according to an embodiment of the invention. As discussed below, because the GA loop 102 includes a digital VGA 104, which is located behind the ADC 50, the GA loop has a significantly lower latency than the GA loop 36 of FIG. 2B, and thus requires significantly fewer samples of the preamble (FIG. 1) than the loop 36 requires to acquire the gain of the VGA. Consequently, the GA loop 102 may allow a significant reduction in the length of the preamble as compared to the length of the preamble required by the GA loop 36. Furthermore, unlike the GA loop 36, the GA loop 102 (and the GT loop as discussed below) is entirely within the digital portion (the portion in back of the analog front end) of the read channel 100, and thus may increase the isolation between the digital and analog portions of the read channel. For clarity, like numbers are used to reference components of the read channel 90 that are common to the read channel 30 of FIG. 2B.

Figure 2B:
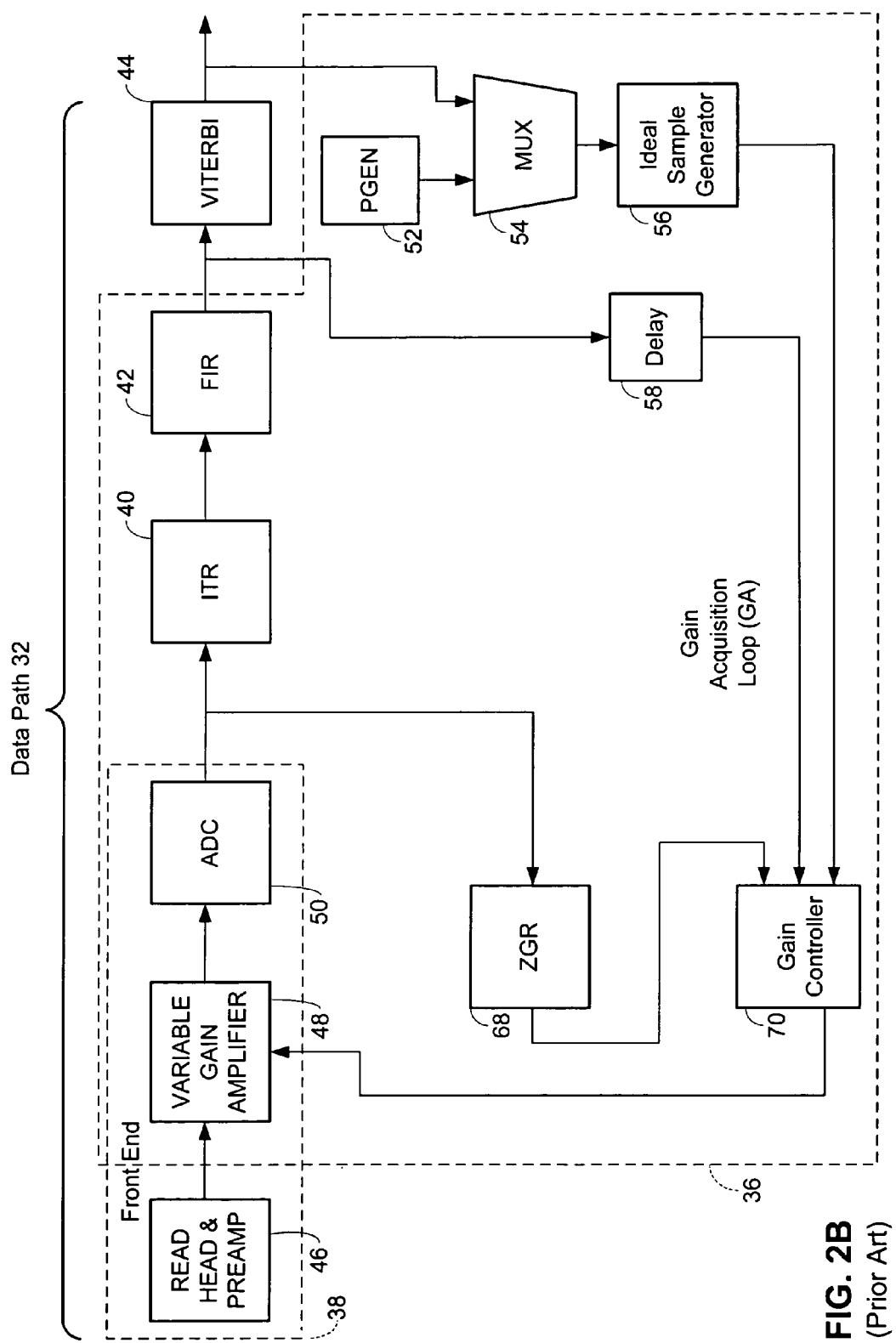
FIG. 2B is a block diagram of a read channel for a disk drive, and of a gain acquisition (GA) loop of the read channel.
Figure 3:
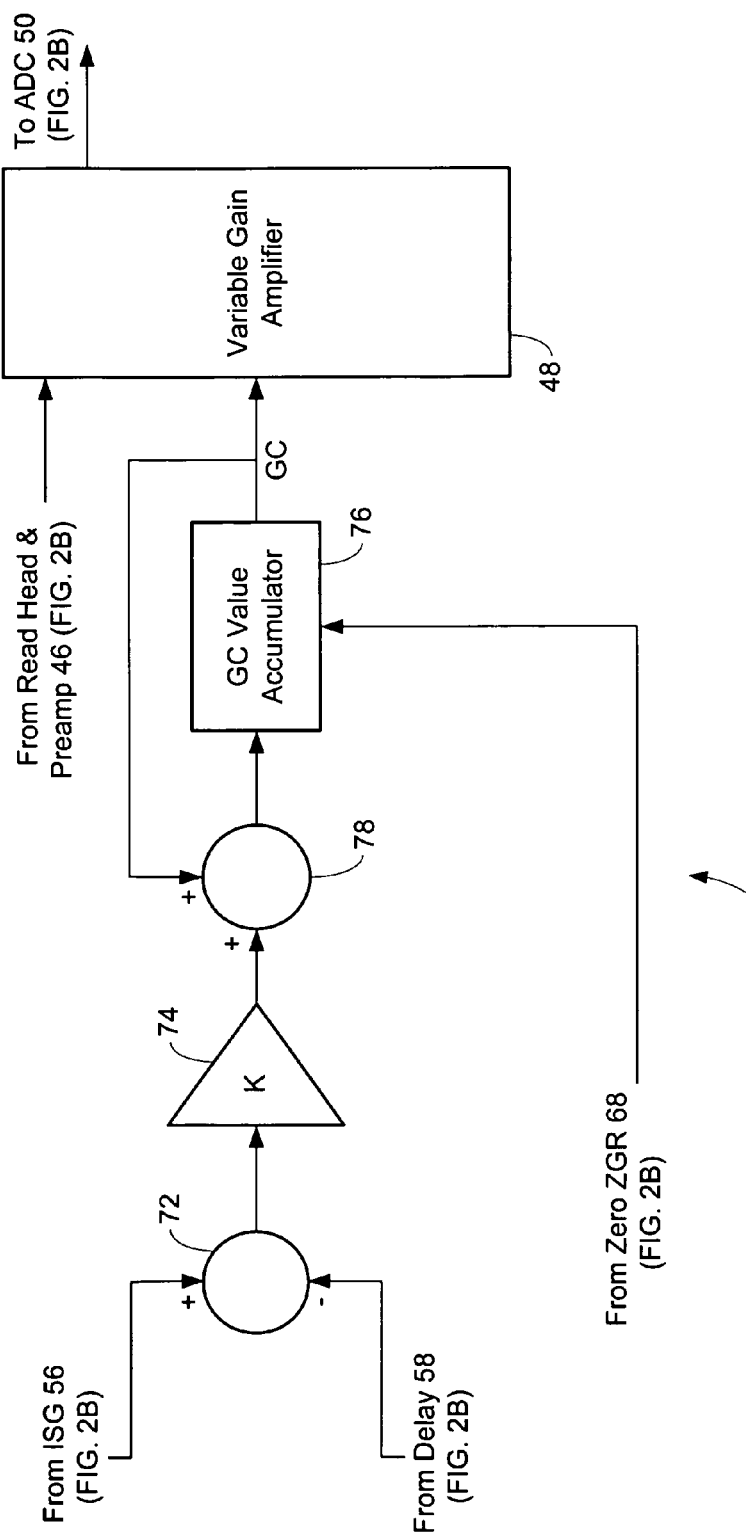
FIG. 3 is a schematic diagram of the gain controller and the analog (variable-gain amplifier) (VGA) for the GA loop of FIG. 2B.

In addition to the ITR circuit 40, FIR 42, and Viterbi detector 44, a data path 106 of the read channel 100 includes the digital VGA 104 and a front end 108, which includes the read head and preamplifier 46 and the ADC 50 but which lacks the analog VGA 48 of FIG. 2B.

And in addition to the FIR 42, PGEN 52, MUX 54, ISG 56, delay circuit 58, and the ZGR circuit 68, the GA loop 102 includes the digital VGA 104 and a gain controller 110, which differs from the gain controller 70 of FIG. 2B as described below in conjunction with FIG. 6. The GA loop 102 has a lower latency than the GA loop 36 of FIG. 2B because unlike the loop 36, the loop 102 lacks the ADC 50 and the ITR circuit 40. In one example, the latency of the GA loop 102 can be as low as 3 periods of the sample clock.

Furthermore, the read channel 100 includes a GT loop (not outlined in FIG. 6), which is similar to the GA loop 102 except that the GT loop includes the Viterbi detector 44 and lacks the PGEN 52 and the ZGR circuit 68. The GT loop of the read channel 100 has a reduced latency as compared to the GT loop of the read channel 30 of FIG. 2B, and thus may have a faster response time than the GT loop of the read channel 30. This may make the GT loop of the read channel 100 better suited for a disk drive that experiences significant vibration, such as a disk drive in a carryable device.

Figure 6:
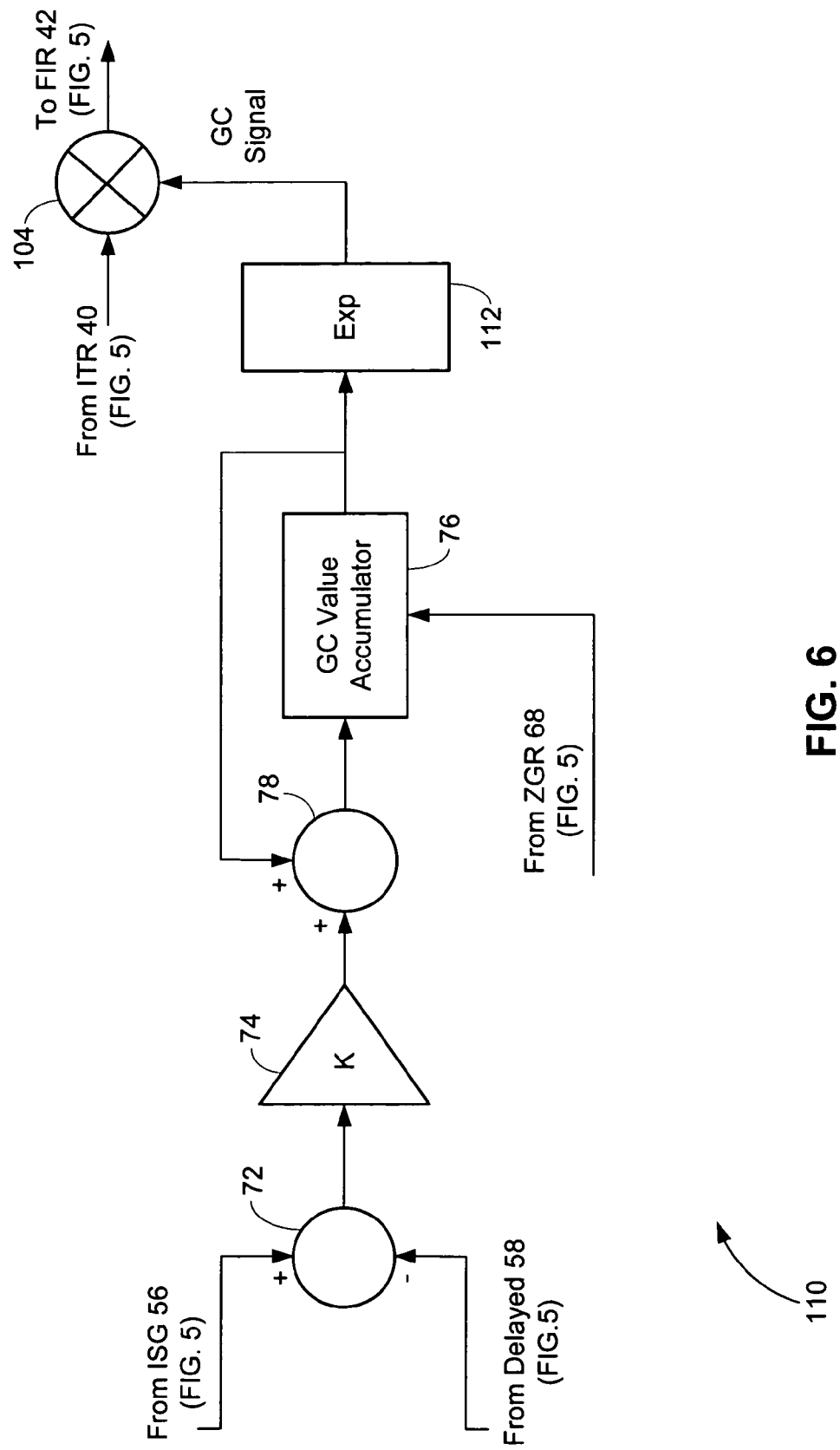
FIG. 6 is a schematic block diagram of the gain controller and the digital VGA for the GA loop of FIG. 5 according to an embodiment of the invention.

FIG. 6 is a schematic block diagram of the gain controller 110 and the digital VGA 104 of FIG. 5 according to an embodiment of the invention. For clarity, like numbers are used to reference components of the gain controller 110 that are common to the gain controller 70 of FIG. 3.

In addition to the comparator 72, the amplifier 74, the accumulator 76, and the adder 78, the gain controller 110 includes an exponential circuit 112, which generates the GC signal (GCS) by raising a predetermined base number B to the GC value (GCV) stored in the accumulator according to the following equation:

$$GCS = B^{GCV} \quad (1)$$

The base B may equal e, which is the base of the natural logarithm Ln, or any other number.

It has been found that the exponential circuit 112 stabilizes the GA loop 102 (FIG. 5) by reducing or eliminating transient "ringing", i.e., overshoot, of the gain of the VGA 104, which in this embodiment is a digital multiplier. Because the VGA 104 is part of the GA loop 102, changing the gain of the VGA also changes the gain of the GA loop. Consequently, whenever the GA loop 102 changes the gain of the VGA, the loop also changes its own loop gain. As is known, if the gain of the GA loop 102 is too high, then the loop may cause the VGA gain to overshoot. For example, overshoot of the VGA gain may occur when a GA loop having a too-high loop gain overcorrects a relatively small error in the gain of the VGA, where the relatively small size of the error is indicated by a relatively small difference between the ideal and actual sample values. To compensate for this potential overcorrection, however, the exponential circuit 112 generates a relatively small GC signal for a small difference between the ideal and actual sample values, and thus reduces or eliminates overshoot by causing a relatively small change in the gain of the VGA 104. But for relatively large VGA gain errors indicated by relatively large differences between the ideal and actual sample values, the circuit 112 generates a relatively large GC signal to more quickly reduce the VGA gain error. Therefore, for large VGA gain errors, the circuit 112 initially imparts to the GA loop 102 a relatively large loop gain to allow the VGA gain to more quickly converge to a desired value that gives the desired amplitude of the read signal. But as the VGA gain approaches the desired value, the circuit 112 imparts to the GA loop 102 a smaller loop gain to reduce or eliminate overshoot. That is, the circuit 112 effectively makes the GA loop 102 "faster" for a larger VGA gain error and "slower" for a smaller VGA gain error.

Still referring to FIG. 6, in one example of the gain controller 110, the exponential circuit 112 includes a look-up table (LUT not shown) that approximates equation (b 1) where B=e. The LUT receives from the accumulator 76 the seven most significant bits (MSBs) of the GC value, which define a range from −44 to +44. In response to the seven MSBs from the accumulator 76 equaling −44, the LUT provides a GC signal that causes the VGA 104 to have a gain of −6 db. And in response to the seven MSBs from the accumulator 76 equally to +44, the LUT provides a GC signal that causes the VGA 104 to have a gain of +6 db. When the possible values of the seven MSBs are plotted on along an x axis having a natural-logarithmic scale and the VGA gain is plotted along a y axis having a linear scale, the resulting plot (not shown) of the VGA gain is represented by a substantially straight line between −6 db and +6 db.

Referring to FIGS. 5-6, the operation of the GA loop 102 is discussed according to an embodiment of the invention.

In response to a read-data-sector command from the computer or other system (not shown in FIGS. 5-6) in which the read channel 100 is incorporated, the front end 108 begins reading and generating samples of the sinusoidal preamble (FIG. 1) at the beginning of the data sector (not shown in FIGS. 5-6) being read. The GA loop 102 begins to set the gain of the VGA 104 to a suitable value. For purposes of explaining the operation of the GA loop 102, it is assumed that at all times the PA loop (not shown in FIGS. 5-6) of the read channel 100 provides to the ITR 40 a value of the phase-correction value T suitable for proper operation of the GA loop. This assumption is typically valid, because the ZPR (not shown) of the PA loop and the ZGR 68 operate independently of one another, and the initial values provided by the ZPR and ZGR allow the PA and GA loops to operate properly. This assumption is particularly valid if the read channel 100 incorporates the PA loop 92 of FIG. 4, because the accuracy of this PA loop is substantially independent of the amplitude of the read signal.

The ZGR circuit 68 determines an initial difference between the amplitude of the read signal and the desired amplitude using the first n samples of the sinusoidal preamble from the ADC 50, and from this difference calculates an initial GC value. For example, n may range from 8-24 samples.

Next, the ZGR circuit 68 loads the initial GC value into the accumulator 76, which provides this initial GC value to the exponential circuit 112. After loading the initial GC value into the accumulator 76, the ZGR circuit 68 may be inactivated until a subsequent data sector is read.

Then, the exponential circuit 112 generates the GC signal from the received initial GC value per equation (1) or as otherwise discussed above, and provides the GC signal to the VGA 108.

Next, the PGEN 52, MUX 54, ISG 56, and delay circuit 58 operate as discussed above in conjunction with the operation of the PA loop 34 of FIG. 2A. The ideal sample value from the ISG 56 has a value that represents the desired amplitude of the actual data sample at the output of the FIR 42.

Then, the comparator 72 determines the difference between the actual and ideal sample values from the delay circuit 58 and the ISG 56, respectively, and provides this difference to the amplifier 74.

Next, the amplifier 74 amplifies the difference from the comparator 72 to generate an intermediate gain error, and provides the intermediate gain error to the adder 78.

Then, in response to the intermediate gain error from the amplifier 74, the adder 78 adjusts the GC value in the accumulator 76.

The GA loop 102 operates in this iterative fashion for subsequent samples of the preamble until the GC value in the accumulator 76 and the corresponding GC signal from the circuit 112 converge to respective values that cause the read signal output from the FIR 42 to have a predetermined desired amplitude.

During tracking of the GC value and the GC signal, the GT loop—although not outlined in FIG. 5, the GT loop is the same as the GA loop 102 except that the GT loop includes the Viterbi detector 44 and lacks the PGEN 52 and the ZGR circuit 68—operates in a manner similar to the manner in which the GA loop 102 operates to maintain the amplitude of the read signal output from the FIR 42 at a desired level. Consequently, as discussed above in conjunction with FIG. 2A, the ISG 56 calculates the ideal sample values using the recovered data bits from the Viterbi detector 44 and the target polynomial (e.g., PR4, EPR4, $E^2PR4$) according to which the FIR 42 equalizes the samples of the read signal.

Referring to FIG. 5, other embodiments of the read channel 100 are contemplated. For example, although not shown, the read channel 100 may include the PA loop 92 or the PT loop 94 of FIG. 4. Furthermore, one may modify the GA loop 102 by omitting the PGEN 52 and the MUX 54 and coupling the output of the Viterbi detector 44 directly to the input of the ISG 56. This modification would result in the GA loop 102 being similar to the GT loop but for the ZGR circuit 68 in the GA loop. Moreover, although described for use in a disk drive, one may modify the read channel 100 for use in other data-reading devices. For example, one may replace the read head and preamplifier 46 with an antenna and demodulation circuitry and make other modifications so that the read channel 100 is suitable for use in a cell phone. In addition, one may position the VGA 104 anywhere within the data path 106 between the output of the ADC 50 and the input of the Viterbi detector 44; for example one may place the VGA 104 immediately after the ADC 50. Furthermore, the data path 106 may include multiple VGAs that are similar to the VGA 104 or to the analog VGA 48 (FIG. 2B) and that are controlled by the GA loop 102 or by another GA loop (not shown), or the data path may include one or more digital or analog fixed-gain amplifiers. Moreover, portions of the read channel 100 not needed during phase and gain acquisition, such as possibly the Viterbi detector 44, may be disabled during operation of the GA loop 102 (and of the PA loop that is not shown in FIGS. 5-6) to, e.g., save power and reduce signal noise.

Referring to FIG. 6, other embodiments of the gain controller 110 are contemplated. For example, one may replace the exponential circuit 112 with a circuit that performs another mathematical function such as $GCS=GCV^x$.

Figure 7:
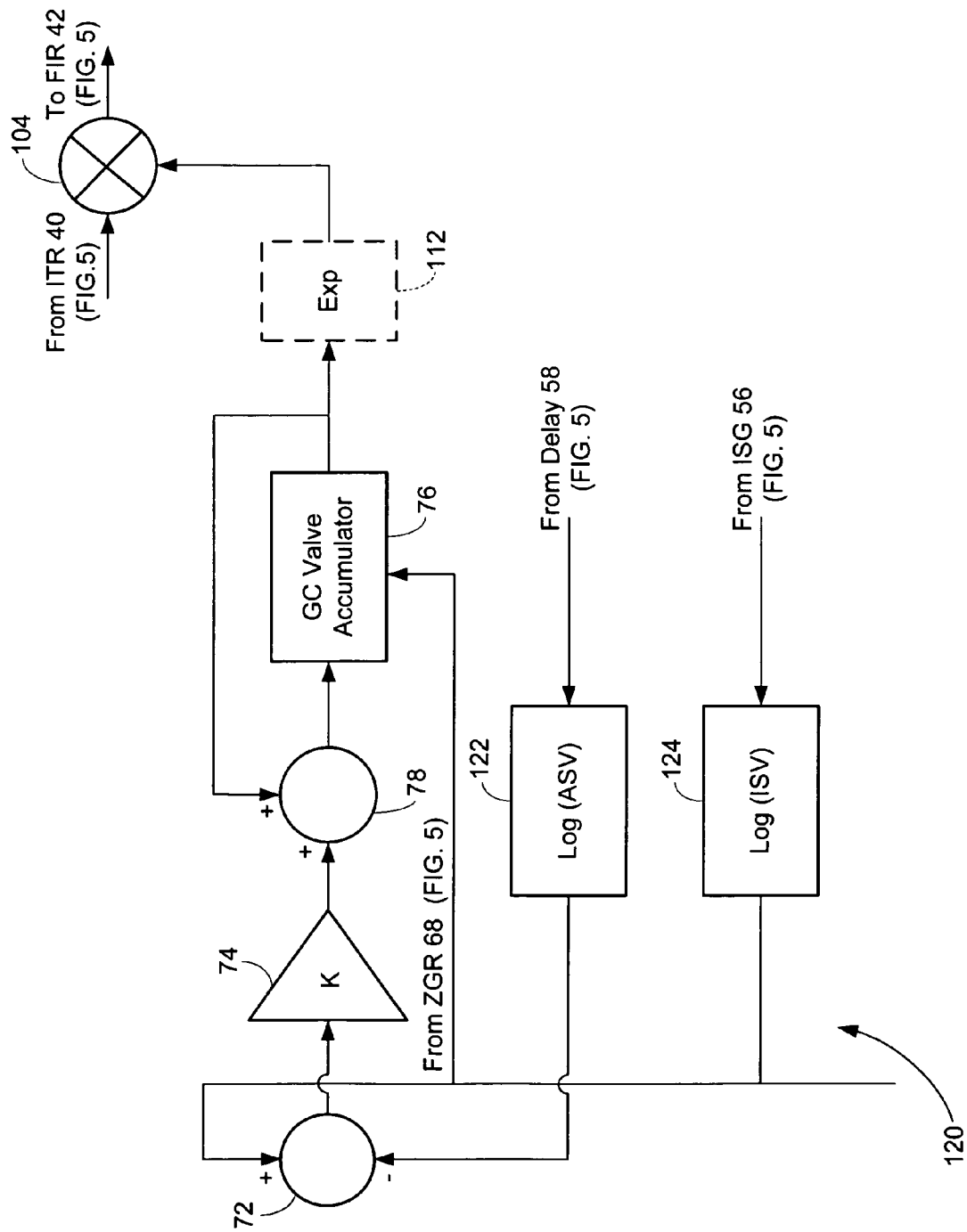
FIG. 7 is a schematic block diagram of the gain controller and the digital VGA for the GA loop of FIG. 5 according to another embodiment of the invention.

FIG. 7 is a schematic block diagram of the VGA 104 of FIG. 5 and of a gain controller 120, which can replace the gain controller 110 in the GA loop 102 of FIG. 5, according to an embodiment of the invention. For clarity, like numbers are used to reference components of the gain controller 120 that are common to the gain controller 110 of FIG. 6.

Unlike in the gain controller 110 of FIG. 6, the comparator 72 of the gain controller 120 generates the logarithm of the ratio of an ideal sample value (ISV) and actual sample value (ASV) (i.e., Log(ISV/ASV) instead of the difference between the ideal and actual sample values (ISV−ASV). Because for given ideal and actual sample values this logarithmic ratio is typically smaller than the difference between the ideal and actual sample values, adding the logarithmic ratio instead of the difference to the GC value in the accumulator 76 effectively reduces the gain of the GA loop 102 (FIG. 5), and thus helps to stabilize the loop and to reduce or eliminate overshoot as discussed above in conjunction with FIG. 6.

To allow the comparator 72 to generate the logarithmic ratio Log(ISV/ASV), the gain controller 120 includes two logarithm circuits 122 and 124, which respectively convert the actual sample values ASV from the delay circuit 58 (FIG. 5) and the ideal sample values ISV from the ISG 56 (FIG. 5) into the logarithmic values Log(ASV) and Log(ISV). The comparator 72 then generates Log(ISV)−Log(ASV), which equals Log(ISV/ASV) according to a known property of logarithms. In one example of the gain controller 120, the logarithm circuits 122 and 124 are respective LUTs.

Furthermore, because the logarithm circuits 122 and 124 stabilize the GA loop 102 (FIG. 5) as discussed above, one may omit the exponential circuit 112 from the gain controller 120.

The gain controller 120 and the GA loop 102 (FIG. 5) incorporating the gain controller 120 instead of the gain controller 110 (FIG. 5) operate as discussed above in conjunction with FIGS. 5-6, except that the comparator 72 generates Log(ISV/ASV) instead of ISV−ASV as discussed above. And if the gain controller 120 lacks the exponential circuit 112, then the accumulator 76 provides the GC value directly to the VGA 104 as the GC signal. Likewise, the gain controller 120 and the GT loop (not outlined but discussed above in conjunction with FIG. 5) incorporating the gain controller 120 instead of the gain controller 110 (FIG. 5) operate as discussed above in conjunction with FIGS. 5-6, except that the comparator 72 generates Log(ISV/ASV) instead of ISV−ASV and the accumulator 76 provides the GC value directly to the VGA 104 as the GC signal if the gain controller 120 lacks the exponential circuit 112.

Still referring to FIG. 7, alternate embodiments of the gain controller 120 are contemplated. For example, the logarithm circuits 122 and 124 may generate the logarithms of ASV and ISV to a base other than ten. For example, the circuits 122 and 124 may generate Ln(ASV) and Ln(ISV), respectively. Furthermore, one may modify the gain control 110 such that the amplifier 74 receives the plain ratio ISV/ASV instead of the logarithmic ratio.

Figure 8:
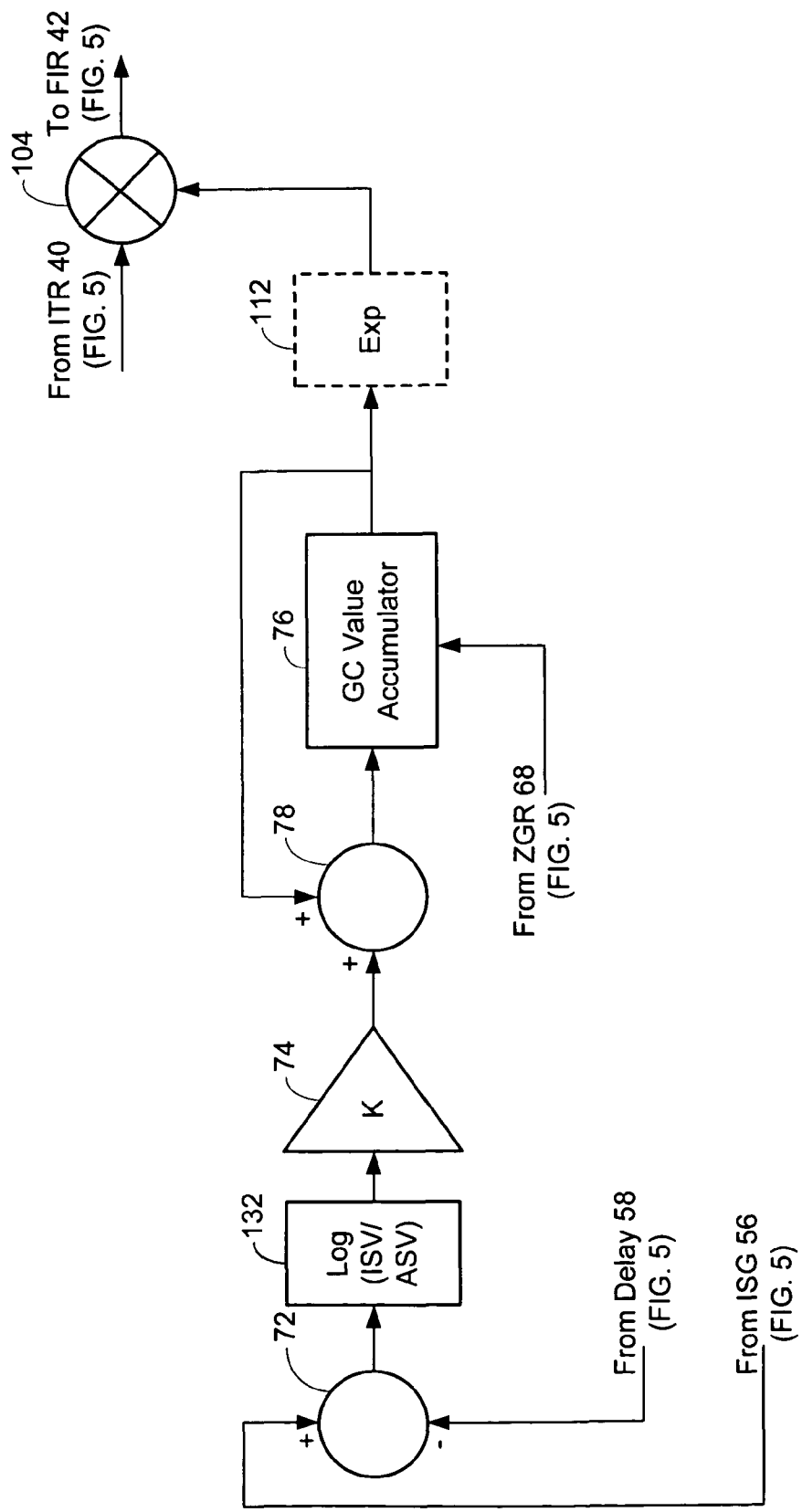
FIG. 8 is a schematic block diagram of the gain controller and the digital VGA for the GA loop of FIG. 5 according to yet another embodiment of the invention.

FIG. 8 is a schematic block diagram of the VGA 104 of FIG. 5 and of a gain controller 130, which can replace the gain controller 110 in the GA loop 102 of FIG. 5, according to an embodiment of the invention. For clarity, like numbers are used to reference components of the gain controller 130 that are common to the gain controller 110 of FIG. 6.

The gain controller 130 is similar to the gain controller 120 of FIG. 7 except that the gain controller 130 includes a logarithm ratio circuit 132 instead of the logarithm circuits 122 and 124 (FIG. 7). Like the circuits 122 and 124, the ratio circuit 132 causes the adder 78 to receive the ratio Log(ISV/ASV). But the ratio circuit 132 generates Log(ISV/ASV) from the difference ISV−ASV that the comparator 72 generates. In one example of the gain controller 130, the logarithm ration circuit 132 includes a LUT.

Furthermore, because the logarithm ratio circuit 132 stabilizes the GA loop 102 (FIG. 5) as discussed above in conjunction with FIG. 7, one may omit the exponential circuit 112 from the gain controller 130.

The gain controller 130 and the GA loop 102 (FIG. 5) incorporating the gain controller 130 instead of the gain controller 110 (FIG. 5) operate as discussed above in conjunction with FIGS. 5-6, except that the ratio circuit 132 provides Log(ISV/ASV) to the adder 78 instead of ISV−ASV as discussed above. And if the gain controller 130 lacks the exponential circuit 112, then the accumulator 76 provides the GC value directly to the VGA 104 as the GC signal. Likewise, the gain controller 130 and the GT loop (not outlined but discussed above in conjunction with FIG. 5) incorporating the gain controller 120 instead of the gain controller 110 (FIG. 5) operate as discussed above in conjunction with FIGS. 5-6, except that the ratio circuit 132 provides Log(ISV/ASV) to the adder 78 instead of ISV−ASV and the accumulator 76 provides the GC value directly to the VGA 104 as the GC signal if the gain controller 130 lacks the exponential circuit 112.

Still referring to FIG. 8, alternate embodiments of the gain controller 130 are contemplated. For example, the logarithm ratio circuit 132 may generate the logarithm of ASV/ISV to a base other than ten. For example, the circuit 132 may generate Ln(ISV/ASV).

Figure 9:
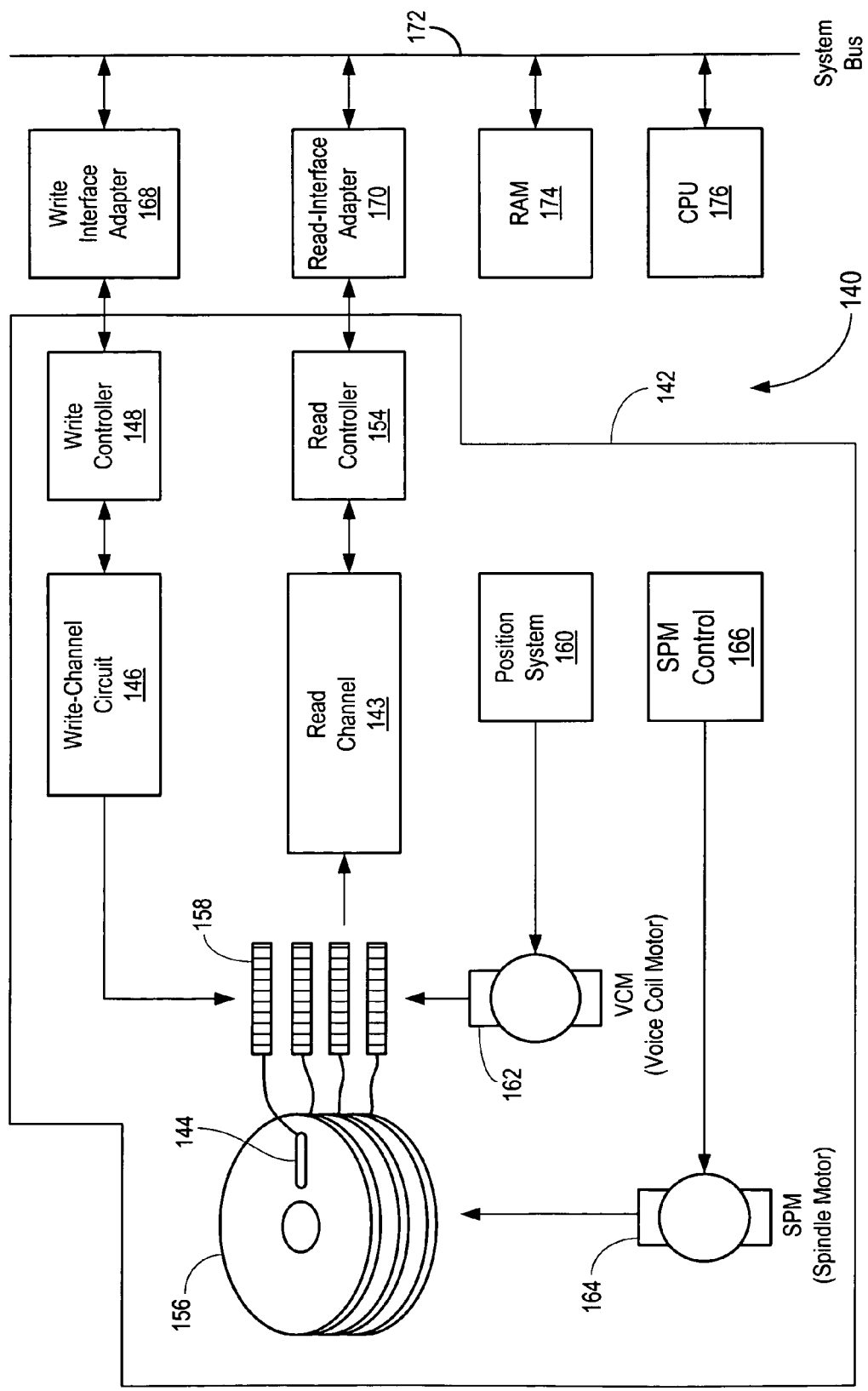
FIG. 9 is a schematic block diagram of a computer system having a disk drive that may incorporate the read channels of FIGS. 4 and 5 according to an embodiment of the invention.

FIG. 9 is a block diagram of a computer system 140, which includes a disk drive 142, according to an embodiment of the invention. The disk drive 142 includes a read channel 143, which may be the same as or similar to the read channel 90 of FIG. 4 or the read channel 100 of FIG. 5. The disk drive 142 includes a combination write/read head 144 (this may be part of the front end 38 of FIG. 4 or the front end 108 of FIG. 5 and replace the read head of the read head and preamplifier 46), a write-channel circuit 146 for generating and driving the head 144 with a write signal, and a write controller 148 for interfacing the write data to the write-channel circuit 146. The disk drive 142 also includes the read channel 143 for receiving a read signal from the head 144 and for recovering data from the read signal, and includes a read controller 154 for organizing the read data. The disk drive 142 further includes a storage medium such as one or more disks 156, each of which may store data on one or both sides. The read/write head 144 writes/reads the data stored on the disks 156 and is connected to a movable support arm 158. A position system 160 provides a control signal to a voice-coil motor (VCM) 162, which positionally maintains/moves the arm 158 so as to positionally maintain/radially move the head 144 over the desired data on the respective disks 156. A spindle motor (SPM) 164 and a SPM control circuit 166 respectively rotate the disks 156 and maintain them at the proper rotational speed.

The disk drive 142 also includes write and read interface adapters 168 and 170 for respectively interfacing the write and read controllers 148 and 154 to a system bus 172, which is specific to the system used. Typical system busses include ISA, PCI, S-Bus, Nu-Bus, etc.

The computer system 140 also typically includes other devices, such as a random access memory (RAM) 174 and a central processing unit (CPU) 176 coupled to the bus 172.

From the foregoing it will be appreciated that, although specific embodiments have been described herein for purposes of illustration, various modifications may be made without deviating from the spirit and scope of the invention. Furthermore, where an alternative is disclosed for a particular embodiment, this alternative may also apply to other embodiments even if not specifically stated.

What is claimed is:

1. A gain controller for a gain loop of a read channel, the gain controller comprising:
    a comparator circuit operable to determine an error between an actual sample of a read signal and a corresponding ideal sample of the read signal wherein the ideal sample of the read signal comprises a signal having a predetermined amplitude based upon an actual sample;
    an accumulator circuit coupled to the comparator circuit and operable to generate a gain correction value based upon the error from the comparator such that the accumulator adjusts the gain correction value in response to the error and in response to the gain correction value; and
    a function circuit coupled to the accumulator circuit, operable to generate a gain correction signal that is different than the gain correction value by performing a predetermined mathematical operation involving the gain correction value, and operable to provide the gain correction signal to a variable gain amplifier that is operable to amplify actual samples of the read signal.

2. The gain controller of claim 1, further comprising an amplifier disposed between the comparator circuit and the accumulator circuit and operable to amplify the error and to provide the amplified error to the accumulator circuit.

3. The gain controller of claim 1 wherein the function circuit comprises a look-up table that has memory locations and that is operable to generate the gain-correction signal equal to a value stored in a memory location corresponding to the gain-correction value.

4. The gain controller of claim 1 wherein the error comprises a difference between the actual sample and the ideal sample.

5. The gain controller of claim 1 wherein the error comprises a logarithm of a ratio between the actual sample and the ideal sample.

6. The gain controller of claim 1 wherein the comparator circuit is operable to determine the error equal to a difference between a logarithm of the actual sample and a logarithm of the ideal sample.

7. A gain controller for a gain loop of a read channel, the gain controller comprising: a comparator circuit operable to determine an error between an actual sample of a read signal and a corresponding ideal sample of the read signal wherein the ideal sample of the read signal comprises a signal having a predetermined amplitude based upon an actual sample;
    an accumulator circuit coupled to the comparator circuit and operable to generate a gain correction value based upon the error from the comparator such that the accumulator adjusts the gain correction value in response to the error and in response to the gain correction value; and a function circuit coupled to the accumulator circuit, operable to generate a gain correction signal by performing a predetermined mathematical operation involving the gain correction value, and operable to provide the gain correction signal to a variable gain amplifier that is operable to amplify actual samples of the read signal; wherein the function circuit is operable to generate the gain correction signal substantially equal to a predetermined base number raised to the gain correction value.

8. A gain controller for a gain loop of a read channel, the gain controller comprising:
    a ratio circuit operable to determine a ratio between an amplitude of an actual sample of a read signal and a corresponding predetermined amplitude of an ideal sample of the read signal; and
    an accumulator circuit coupled to the ratio circuit and operable to generate and hold a gain correction value, to adjust the gain correction value in response to the ratio and in response to the gain correction value, and to provide the adjusted gain correction value to a variable gain amplifier that is operable to amplify actual samples of the read signal.

9. The gain controller of claim 8 wherein the ratio circuit is operable to determine the ratio equal to a logarithm of the ideal sample value divided by the actual sample value.

10. The gain controller of claim 8 wherein the ratio circuit comprises:
    a first logarithm circuit operable to generate a logarithm of the actual sample;
    a second logarithm circuit operable to generate a logarithm of the ideal sample; and
    a comparator coupled to the first and second logarithm circuits and operable to determine the ratio equal to a difference between the logarithm of the actual sample and the logarithm of the ideal sample.

11. The gain controller of claim 8 wherein the ratio circuit comprises:
    a comparator operable to determine a difference between the actual sample and the ideal sample; and
    a look up table coupled to the comparator and operable to generate as the ratio a logarithm of the ideal sample divided by the actual sample in response to the difference between the actual and ideal samples.

12. A gain loop for a read channel, the gain loop comprising:
    a variable gain amplifier that is operable to amplify samples of a read signal in response to a gain control signal; and
    a gain controller, comprising,
        a comparator circuit operable to determine an error between an actual sample of a read signal and a corresponding ideal sample of the read signal wherein the ideal sample of the read signal comprises a signal having a predetermined amplitude based upon an actual sample;

an accumulator circuit coupled to the comparator circuit and operable to generate a gain correction value based upon the error from the comparator such that the accumulator adjusts the gain correction value in response to the error and in response to the gain correction value; and a function circuit coupled to the accumulator circuit, operable to generate the gain correction signal that is different than the gain correction value by performing a predetermined mathematical operation involving the gain correction value, and operable to provide the gain correction signal to the variable gain amplifier.

13. A gain loop for a read channel, the gain loop comprising:
a variable gain amplifier that is operable to amplify samples of a read signal in response to a gain control signal; and
a gain controller, comprising,
a ratio circuit operable to determine a ratio between an actual sample of a read signal and a corresponding ideal sample of the read signal, and
an accumulator circuit coupled to the ratio circuit and operable to hold a gain correction value, to adjust the gain correction value in response to the ratio and in response to the gain correction value, and to provide the adjusted gain correction value to the variable gain amplifier as the gain correction signal.

14. A read channel, comprising:
an analog to digital converter operable to generate actual samples of a read signal; and
a gain loop, comprising,
a variable gain amplifier coupled to the analog-to digital converter and operable to amplify the actual samples of the read signal in response to a gain correction signal, and
a gain controller, comprising,
a comparator circuit operable to determine an error between an actual sample of a read signal and a corresponding ideal sample of the read signal wherein the ideal sample of the read signal comprises a signal having a predetermined amplitude based upon an actual sample;
an accumulator circuit coupled to the comparator circuit and operable to generate a gain correction value based upon the error from the comparator such that the accumulator adjusts the gain correction value in response to the error and in response to the gain correction value; and
a function circuit coupled to the accumulator circuit, operable to generate the gain correction signal that is different than the gain correction value by performing a predetermined mathematical operation involving the gain correction value, and operable to provide the gain correction signal to the variable gain amplifier.

15. The read channel of claim 14 wherein the gain loop comprises a gain acquisition loop.

16. The read channel of claim 14 wherein the gain loop comprises a gain tracking loop.

17. A read channel, comprising:
an analog to digital converter operable to generate actual samples of a read signal; and
a gain loop, comprising,
a variable gain amplifier that is operable to amplify the actual samples of the read signal in response to a gain control signal, and a gain controller, comprising,
a ratio circuit operable to determine a ratio between an amplitude of
an actual sample of a read signal and a corresponding predetermined amplitude of an ideal sample of the read signal; and
an accumulator circuit coupled to the ratio circuit and operable to generate and hold a gain correction value, to adjust the gain correction value in response to the ratio and in response to the gain correction value, and to provide the gain correction value to the adjusted variable gain amplifier as the gain correction signal.

18. The read channel of claim 17 wherein the gain loop comprises a gain acquisition loop.

19. The read channel of claim 17 wherein the gain loop comprises a gain tracking loop.

20. A disk drive, comprising:
a read channel, comprising,
a read head operable to generate a read signal that carries data stored on a storage disk,
an analog to digital converter coupled to the read head and operable to generate actual samples of the read signal, and
a gain loop, comprising,
a variable gain amplifier coupled to the analog-to digital converter and operable to amplify the actual samples of the read signal in response to a gain correction signal, and
a gain controller, comprising,
a comparator circuit operable to determine an error between an actual sample of a read signal and a corresponding ideal sample of the read signal wherein the ideal sample of the read signal comprises a signal having a predetermined amplitude based upon an actual sample;
an accumulator circuit coupled to the comparator circuit and operable to generate a gain correction value based upon the error from the comparator such that the accumulator adjusts the gain correction value in response to the error and in response to the gain correction value, and
a function circuit coupled to the accumulator circuit, operable to generate the gain correction signal that is different than the gain correction value by performing a predetermined mathematical operation involving the gain correction value, and operable to provide the gain correction signal to the variable gain amplifier.

21. The disk drive of claim 20, further comprising the storage disk.

22. The disk drive of claim 20 wherein the storage disk comprises a magnetic disk.

23. A disk drive, comprising:
a read channel, comprising,
a read head operable to generate a read signal that represents data stored on a storage disk,
an analog to digital converter coupled to the read head and operable to generate actual samples of the read signal, and
a gain loop, comprising,
a variable gain amplifier that is operable to amplify the actual samples of the read signal in response to a gain control signal, and
a gain controller, comprising,
a ratio circuit operable to determine a ratio between an amplitude of an actual sample of a read signal and a corresponding predetermined amplitude of an ideal sample of the read signal, and an accumulator circuit coupled to the ratio circuit and operable to generate and hold a gain correction value, to adjust the gain correction value in response to the ratio and in response to the gain correction value, and to provide the adjusted gain correction value to the variable gain amplifier as the gain correction signal.

24. A method, comprising:

determining an error between an actual sample of a read signal and a corresponding ideal sample of the read signal;

generating a gain correction value by integrating the error;

generating a gain correction signal that is different than the gain correction value as an exponential mathematical function of the gain correction value; and amplifying actual samples of the read signal by a factor having a predetermined relationship to the gain correction signal.

25. The method of claim 24 wherein generating the gain correction signal comprises generating the gain correction signal from a value retrieved from a memory location to which the gain correction value points.

26. The method of claim 24 wherein the error comprises a difference between the actual sample and the ideal sample.

27. The method of claim 24 wherein the error comprises a ratio of the actual sample and the ideal sample.

28. A method, comprising:

determining an error between an amplitude of an actual sample of a read signal and a predetermined amplitude of a corresponding ideal sample of the read signal;

generating a gain correction value by integrating the error;

generating a gain correction signal as a mathematical function of the gain correction value; and amplifying actual samples of the read signal by a factor having a predetermined relationship to the gain correction signal;

wherein generating the gain correction signal comprises generating the gain correction signal substantially equal to a predetermined number raised to the gain correction value.

29. A method, comprising:

determining a ratio of an amplitude of an actual sample of a read signal and a corresponding predetermined amplitude of an ideal sample of the read signal;

generating a gain correction value in response to the ratio;

adjusting the gain correction value in response the ratio and in response to the generated gain correction value;

and amplifying actual samples of the read signal with a gain having a predetermined relationship to the adjusted gain correction value.

30. The method of claim 29 wherein determining the ratio comprises determining a logarithmic ratio of the actual and ideal samples.

31. The method of claim 29 wherein generating the gain correction value comprises retrieving the gain correction value from a memory location to which a difference between the actual and ideal samples points.

* * * * *